[19] United States Patent
Miyao et al.

[11] 4,380,777
[45] Apr. 19, 1983

[54] KEYED AGC CIRCUIT FOR VIDEO DATA TRANSMITTING DEVICE

[75] Inventors: Fumio Miyao, Kanagawa; Kazumi Tsukioka, Nagano, both of Japan

[73] Assignee: Fuji Xerox Co., Ltd., Tokyo, Japan

[21] Appl. No.: 216,703

[22] Filed: Dec. 15, 1980

[30] Foreign Application Priority Data

Dec. 18, 1979 [JP] Japan .................. 54/163593

[51] Int. Cl.³ .............................. H04N 5/52
[52] U.S. Cl. .................................. 358/178
[58] Field of Search ......................... 358/178

[56] References Cited
U.S. PATENT DOCUMENTS
3,909,522  9/1975  Hofmann ...................... 358/178

Primary Examiner—Richard Murray
Attorney, Agent, or Firm—Sughrue, Mion, Zinn, Macpeak & Seas

[57] ABSTRACT

A keyed AGC circuit for use in a video data transmitting device such as a facsimile system which operates stably in the presence of external noise. A processing circuit is provided for carrying out digital processing determining whether the synchronizing signal level at an output terminal of the AGC circuit is higher or lower than a pre-set reference level. A multi-stage digital attenuator is controlled in response to outputs of the processing circuit to set the attenuation level. Control of the multi-stage digital attenuator can start with either the most significant bit position of the attenuator prior to video data transmission or with a least significant bit position of the attenuator in a synchronization period after video data transmission has been started.

5 Claims, 9 Drawing Figures

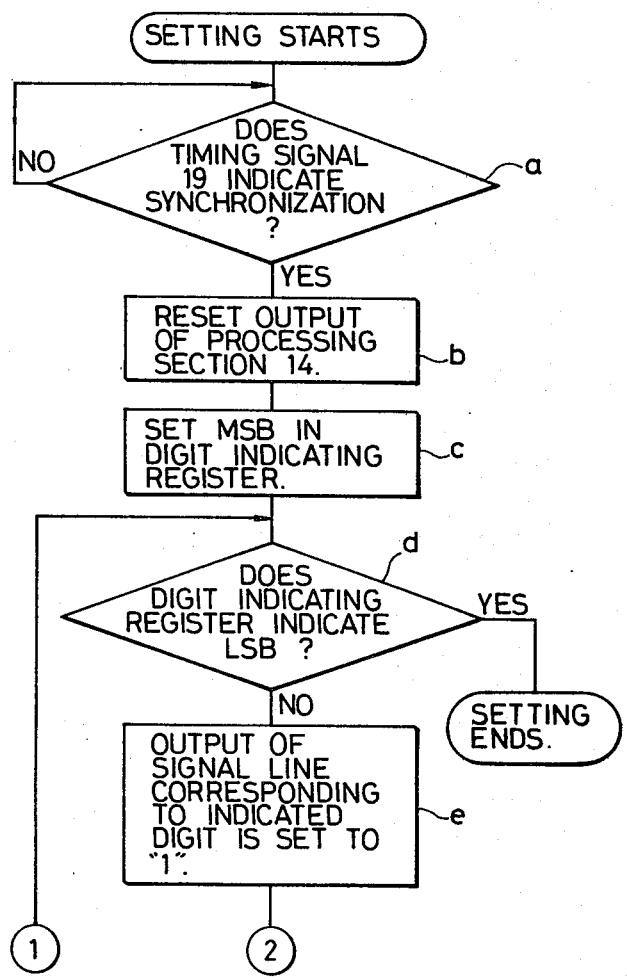

4,380,777

KEYED AGC CIRCUIT FOR VIDEO DATA TRANSMITTING DEVICE

BACKGROUND OF THE INVENTION

The present invention relates to an automatic gain control (AGC) circuit used in the signal receiving section of a video data transmitting device such as a facsimile system. More particularly, the invention relates to a keyed AGC circuit which can carry out sensitive operations stably.

Keyed AGC systems have been employed for AGC circuits in facsimile systems because these circuits are very little affected by noise components in an input signal. An example of a conventional keyed AGC system is shown in FIG. 1. An electronic switch 1 is closed only for the synchronization period for each scanning line thus forming a closed loop only during such periods. Upon formation of the closed loop, a part of an output signal 9 is applied through a full-wave rectifier circuit 4 to one input terminal 12 of a level comparator 5 where it is compared with the level at the other input terminal 13 which is preset such as with a potentiometer 7. According to the comparison result at the output of the level comparator 5, a potential holding capacitor 6 is charged or discharged. The potential of the potential holding capacitor 6 is applied through a buffer 2 to a multiplier 3 to thereby set an amplification factor of the multiplier 3 so that, even when the level of an input video signal 8 to the multiplier 3 varies, the level of the output signal 9 is maintained unchanged. In this operation, the period that the closed loop is formed is about 5% of each line scanning period T as shown in FIG. 2 and the amplification factor which is set by the potential of the potential holding capacitor 6 is maintained for a video signal transmission period corresponding to the remaining 95%.

With this circuit construction, it is difficult for the conventional keyed AGC circuit to operate stably because of the variations in potential of the potential holding capacitor 6 due to external noise. Furthermore, in data transmission in a facsimile system, sometimes the amplification factor is not set to the correct value when the closed loop is formed because of momentary interruption of signal transmission circuits.

In addition, with the conventional keyed AGC circuit, it is technically difficult, where the signal level during the synchronization period of the input video signal 8 is greatly varied, for the gain of the multiplier 3 to be controlled precisely thereby and therefore difficult to perform stable operations.

Accordingly, an object of the invention is to provide a keyed AGC circuit in which the above-described difficulties accompanying a conventional circuit have been eliminated and in which stable operations are effected.

SUMMARY OF THE INVENTION

In accordance with this and other objects of the invention, an AGC circuit is provided in which a digital attenuator is employed in such a manner that the amount of attenuation of the attenuator is precisely switched and set in response to the level of the signal for determining the synchronization period of the input video signal.

More specifically, in accordance with the invention there is provided a keyed AGC circuit for a video data transmitting device including a processing circuit for carrying out a digital process to determine whether a synchronizing signal level at an output terminal thereof is higher than a reference level or smaller than the reference level and a multi-stage digital attenuator coupled to be controlled in response to an output of the processing circuit. In one embodiment, control of the multi-stage digital attenuator is started with a most significant bit in a predetermined procedure prior to video data transmission. In another embodiment, control of the multi-stage digital attenuator is started with a least significant bit in a synchronization period after video data transmission has been started. In controlling the multi-stage digital attenuator, when the output signal level is set at a value below the reference level after video data transmission has been started, a set level of immediately below the reference level is employed as the set value. When the signal level is set from above the reference level, a set level immediately above the reference level is employed as the set value.

BRIEF DESCRIPTION OF THE DRAWINGS

FIGS. 6A, 6B and FIG. 7 are flow charts for a description of the operation of the processing section in FIG. 3.

DESCRIPTION OF THE PREFERRED EMBODIMENTS

Figure 3:
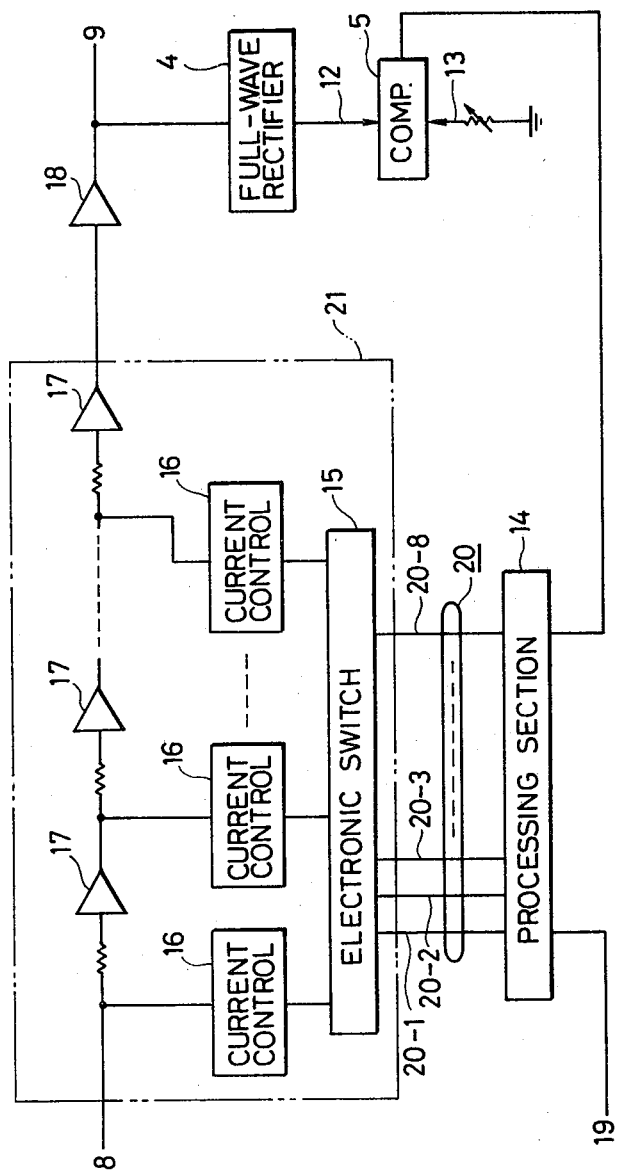
FIG. 3 is a block diagram showing a preferred embodiment of a keyed AGC circuit according to the invention.

FIG. 3 is a schematic diagram of a preferred embodiment of the invention. In FIG. 3, reference numeral 14 designates a processing section such as a microcomputer, 15 an electronic switch which carries out an on-off operation in accordance with signals over signal lines 20 (20-1, 20-2, . . . and 20-8), 16 current control circuits, and 17 operational amplifiers. The switch 15, the current control circuits 16 and the operational amplifier circuits 17 form a digital attenuator 21 which is connected to an amplifier 18. Further in FIG. 3, reference numerals 4 and 5 designate a full-wave rectifier circuit and a level comparator, respectively, which are similar in construction to those in the prior art circuit described with reference to FIG. 1.

Figure 4:
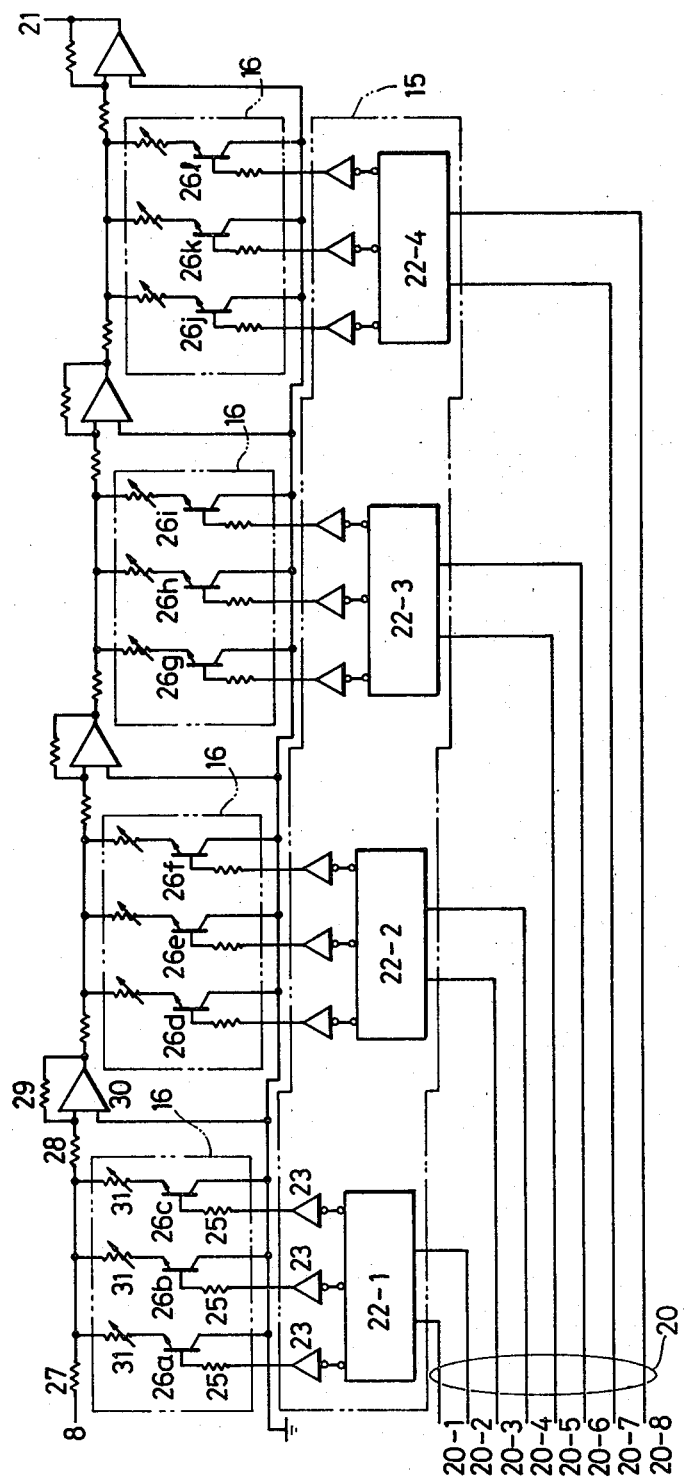
FIG. 4 is a circuit diagram, partly as a block diagram, showing a specific example of a multi-stage digital attenuator used in the circuit in FIG. 3.

The operation and the control of the circuit of FIG. 3 will be further described with reference to FIG. 4 which shows a specific example of the attenuator 21 in FIG. 3. Transistors 26a through 26l are rendered conductive (on) or non-conductive (off) by signals from the electronic switch 15. In FIG. 4, reference numerals 22-1 through 22-4 designate decoders each of which has inputs connected to two of the signal lines 20-1 through 20-8 and outputs connected to three transistors through inverters 23 wherein a selected one of the three transistors is rendered conductive or all of the three transistors are rendered non-conductive. When a transistor 26 is rendered conductive, a part of the input video signal 8 flows to the side of the transistors and therefore the potential of the attenuator output 24 is decreased. Resistors 31 are so adjusted that, when signals are present on both the signal lines 20-1 and 20-2 of the signal lines 20, the transistor 26a is rendered conductive to reduce the potential of the attenuator output 24 to three-quarters of that of the input video signal 8, when a signal is present only on the signal line 20-1, the transistor 26b is rendered conductive to reduce the potential of the attenuator output 24 to half that of the input video signal 8, and when a signal is present only on the signal line 20-2, the potential of the attenuator output 24 with respect to the input video signal 8 is dropped to half the potential which is provided when a signal is available on the signal line 20-1 only. Similar to the above-described case, the resistors 31 are adjusted so that, when a signal is present only on the signal line 20-8, the potential of the attenuator output 24 is reduced to 1/256 that of the input video signal 8. The remainder of the decoders, transistors and decoders function in the same manner wherein a multi-stage digital attenuator is formed which provides 256 steps of attenuation outputs for a binary 8-bit input signal with the signal line 20-8 being connected to receive the LSB (least significant bit) and the signal line 20-1 to receive MSB (most significant bit) of the input signal.

Figure 1:
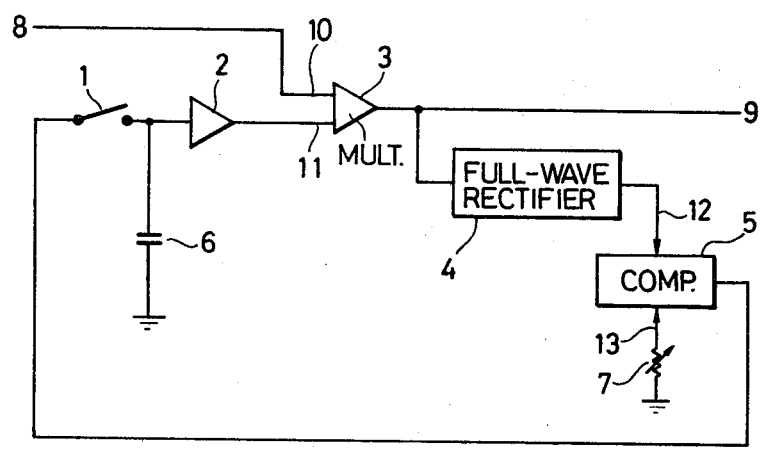
FIG. 1 is a block diagram showing a conventional keyed AGC circuit.
Figure 2:
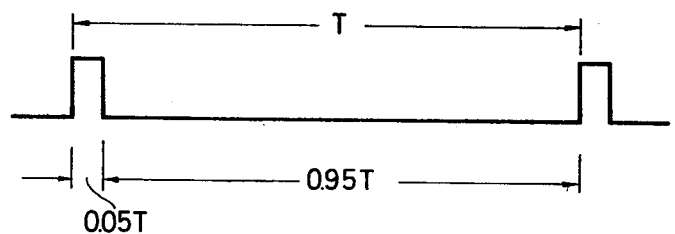
FIG. 2 is a timing chart showing an input signal.

With the digital attenuator 21 of FIG. 3 formed as shown in FIG. 4, a part of the output of the amplifier 18 is applied to the comparator 5 in a similar manner as in the conventional circuit described with reference to FIG. 1 where it is compared with the reference level. The output signal from the comparator 5 is applied to the processing section 14 and an 8-bit value is provided in response thereto on the output lines 20 coupled to the digital attenuator 21 which in turn sets the gain or attenuation factor of the attenuation.

Figure 5A:
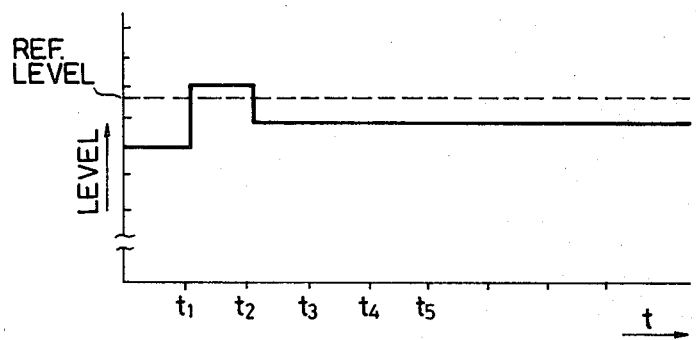
FIGS. 5A and 5B are diagrams for description of the operation of the circuits shown in FIGS. 3 and 4.
Figure 5B:
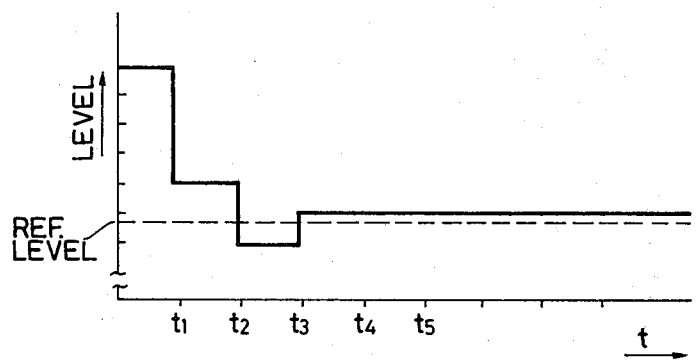

If, in the above-described embodiment of the invention, the attenuator 21 is of a multi-stage type, it may take a significant amount time to accomplish the final setting of the signal on the signal lines 20. In order to overcome this difficulty, an 8-bit value indicated by the output signal lines 20 is determined successively starting with the MSB using a predetermined procedure before a video signal is received. If this technique is employed, even with the 256-stage attenuator shown in FIG. 4, the processing section 14 can carry out the initial setting merely by changing the output several times in succession. During the presence of the video signal, the output of the processing section 14 is changed starting with the LSB to achieve the attenuation setting operation precisely and quickly. In order to prevent fluctuations of the output of the processing section 14 in this case, if the signal level approaches the reference level from below as shown in FIG. 5A, the set level is determined immediately below the reference level. In the case where the signal level approaches the reference level from above as shown in FIG. 5B, the set level is determined immediately above the reference level.

An example of the operation of the processing section employing, for instance, a microcomputer will be described with reference to a flow chart.

Figure 6B:
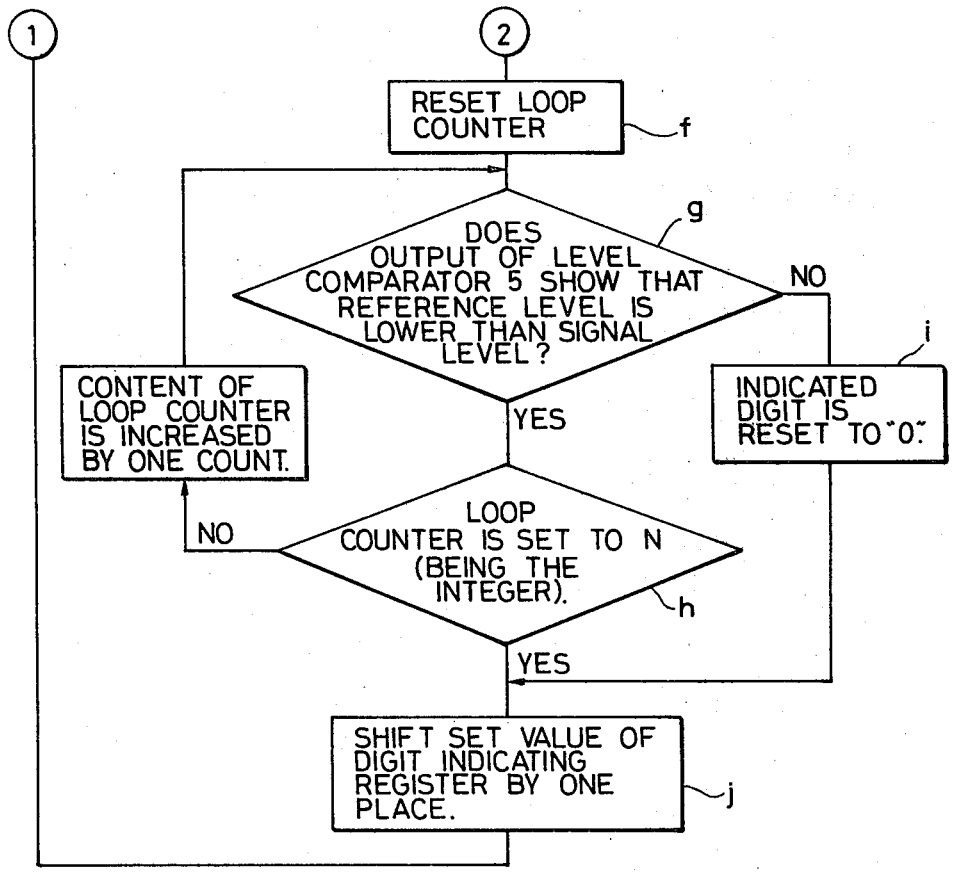

FIGS. 6A and 6B show the operation of the microcomputer during the predetermined procedure. First, it is sensed whether or not a timing signal 19 indicative of an initial setting period in the procedure is present to thereby initiate synchronization for the procedure (Step a). After the timing signal 19 has accomplished the synchronization for the procedure, the output of the processing section 14 is reset (Step b). Then, the MSB is set in a digit indicating register (Step c). It is determined whether or not the LSB has been stored in the digit indicating register (Step d), and if yes, the setting operation is ended, while if no, the output of a signal line corresponding to the indicated digit is set to "1" (Step e). Thereafter, a loop counter is reset (Step f) and it is determined whether the output of the level comparator 5 is in a state indicating that the signal level is higher than or less than the reference level (Step g). If the output of the level comparator 5 indicates that the signal level is higher than the reference level, the loop counter is set to n in response to which the loop is circulated through n times. If, after this, it is determined that the output of the level comparator 5 indicates that the signal level is higher than the reference level, the set value of the digit indicating register is replaced by a value which is obtained by shifting the set value by one place. In practice, n=3 is suitable. If it is determined in Step g that the output of the level comparator 5 indicates that the signal level is lower than the reference level, the indicated digit is reset to "0" (Step i) and the set value of the digit indicating register is replaced by a value which is obtained by shifting the set value one place. Thereafter, the operation is returned to Step d to repeat the same process described above. When the digit indicating register indicates that the LSB in Step d has been set, the above-described operation is ended.

As is clear from the above description, in the preferred procedure, first a signal not attenuated at all is inputted to the level comparator 5 and the output value is set successively starting with the MSB. When the signal level of the full-wave rectifier 4 reaches a value slightly above the reference level, the processing is ended. With this operation, the initial setting is achieved. The reason why the loop is circulated through n time in Steps g and h is to prevent the occurrence of errors due to noise.

Figure 7:
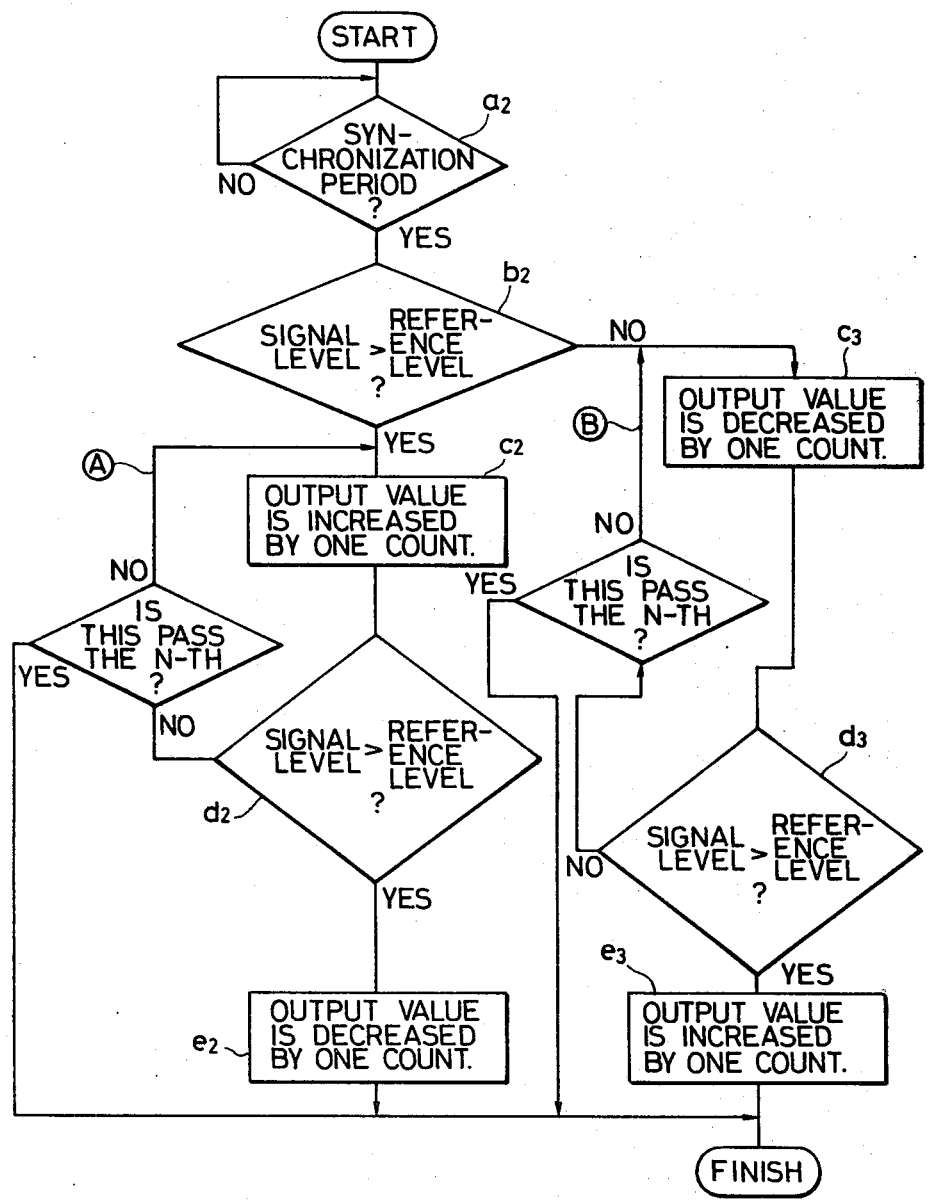

FIG. 7 is a flow chart showing an AGC correction process during the synchronization period in a video signal communication. First, a synchronization period is determined in accordance with the frame period of the video signal communication (Step $d_2$), and the level comparator 5 senses whether the output signal level of the full-wave rectifier 4 is higher than the reference level or lower (Step $b_2$). When the signal level is higher than the reference level, the output value on the signal lines 20 is increased by one count Step $c_2$). Then, it is determined again whether the signal level is higher than the reference level or lower (Step $d_2$). If the signal level is higher than the reference level, then the loop is circulated through n times (loop (A)). If the signal level is lower than the reference level, the output value on the signal lines 20 is decreased by one count (Step $e_2$). When the loop (A) has been circulated through n times, that is, when Step $e_2$ has been completed, the processing is ended. In practice, n=3 is suitable.

If "NO" is determined in Step $b_2$, the output value on the signal lines 20 is decreased by one count (Step $c_3$) and it is determined whether the signal level is higher than the reference level or lower (Step $d_3$). When the signal level is higher than the reference level, the loop is circulated through n times (loops (B)). When the signal level is lower than the reference level, the output value on the signal lines 20 is increased by one count (Step $e_3$). When the loop (B) has been circulated through n times, that is, when Step $e_3$ has been achieved, the whole processing is ended. In practice, n=3 is suitable.

As is apparent from the above description, the maximum number of repetitive operations through the loops (A) and (B) is restricted to n. Therefore, disruption or abrupt variation of the output is prevented.

According to the invention, a keyed AGC circuit is formed with a processing section such as a microcomputer, multi-stage digital attenuator, comparator, etc. The keyed AGC circuit is relatively free from line troubles and is not affected by external noise and is thus able to carry out stable operations. As the number of stages in the digital attenuator can be increased as required, the keyed AGC circuit has a wide dynamic range and can perform sensitive and precise operations. Since the various sections are digitally formed, the keyed AGC circuit can be provided in the form of an LSI with the result that costs and reliability of the circuit are improved.

What is claimed is:

1. A keyed AGC circuit for a video data transmitting device comprising: a process circuit for carrying out a digital process to determine whether a synchronizing signal level at an output terminal thereof is higher than or lower than a reference level; and a multi-stage digital attenuator coupled to be controlled in response to an output of said processing circuit, said processing circuit comprising means for setting an attenuation level of said attenuator in a plurality of successive steps in accordance with said synchronizing signal level.

2. The keyed AGC circuit as claimed in claim 1 wherein control of said multi-stage digital attenuator is started with a most significant bit position of said attenuator in a predetermined procedure prior to video data transmission.

3. The keyed AGC circuit as claimed in claim 1 wherein control of said multi-stage digital attenuator is started with a least significant bit position of said attenuation in a synchronization period after video data transmission is started.

4. The keyed AGC circuit as claimed in claim 1 wherein, in controlling said multi-stage digital attenuator, when said signal level is set from below said reference level after video data transmission has been started, a set level immediately below said reference level is employed as a set value, and when said signal level is set from above said reference level, a set level immediately above said reference level is employed as a set value.

5. The keyed AGC circuit as claimed in claim 1 wherein said multi-stage digital attenuator comprises a plurality of operational amplifiers coupled in series with one another through resistors; multi-stage transistor switch means coupled to inputs of each of said operational amplifiers, each of said transistor switch means having a resistance of predetermined value coupled between said transistor switch means and the corresponding input; decoder means having outputs coupled to operate said transistor switch means, inputs of said decoder means being coupled to outputs of said processing circuit; and comparison means coupled to compare the signal level at said output terminal with a pre-set level, an output of said comparison means being coupled to an input of said processing section.

* * * * *